May 20, 1958     H. W. AUSTIN     2,835,250
MASK FOR BREATHING APPARATUS
Filed July 30, 1956

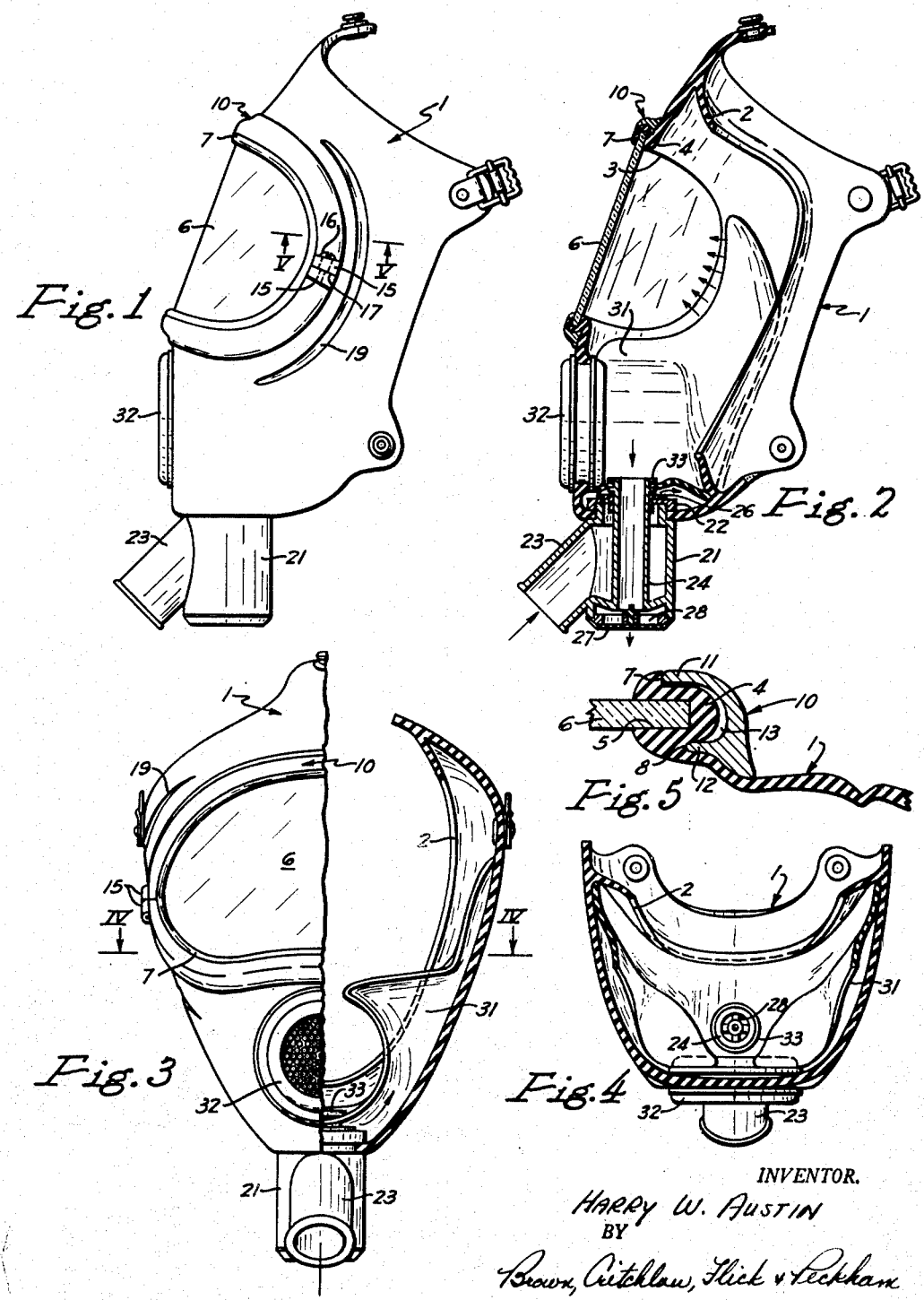

INVENTOR.
HARRY W. AUSTIN
BY
Brown, Critchlow, Flick & Peckham
HIS ATTORNEYS

United States Patent Office 2,835,250
Patented May 20, 1958

2,835,250

MASK FOR BREATHING APPARATUS

Harry W. Austin, Monroeville, Pa., assignor to Mine Safety Appliances Company, Pittsburgh, Pa., a corporation of Pennsylvania Application July 30, 1956, Serial No. 600,825

11 Claims. (Cl. 128—141)

This invention relates to breathing apparatus masks. It is among the objects of this invention to provide a mask which will fit faces of many different shapes, which provides improved visibility, and in which the flow of incoming air inside the mask is directed in predetermined paths.

The invention is illustrated in the accompanying drawings, in which

Figure 6:
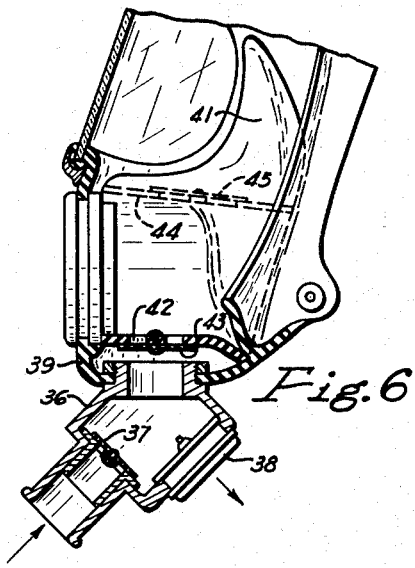
Figure 8:
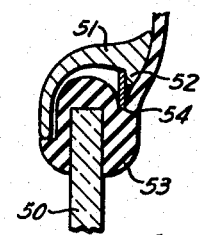
Figure 7:
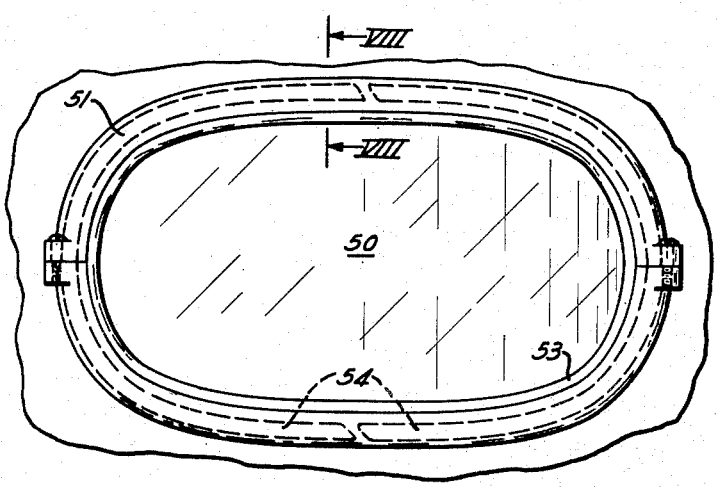

Fig. 1 is a side view of my mask;
Fig. 2 is a central vertical section therethrough;
Fig. 3 is a front view with half of the facepiece broken away;
Fig. 4 is a horizontal section taken on the line IV—IV of Fig. 3;
Fig. 5 is an enlarged fragmentary section taken on the line V—V of Fig. 1;
Fig. 6 is a view, similar to Fig. 2, of a modification;
Fig. 7 is a fragmentary front view of a facepiece showing a different way of holding the lens in place; and
Fig. 8 is an enlarged fragmentary section taken on the line VIII—VIII of Fig. 7.

Referring to Figs. 1 to 5 of the drawings a flexible facepiece 1 of more or less conventional shape is formed from rubber or similar material. Inside of the facepiece near its margin there is a continuous flexible lip 2 which extends inwardly and forward to form a seal against the face in a well-known manner. Extending a considerable distance across the transversely curved facepiece is a long opening 3 to give the wearer a wide range of vision. The opening has curved ends and substantially parallel upper and lower edges. Surrounding the opening is a thick flexible bead 4 integral with the outside of the facepiece. This bead provides the necessary thickness for a slot 5 (Fig. 5) that receives the marginal portion of a single, longitudinally curved lens 6, which is surrounded by the bead. The bead is also provided with a shoulder 7 extending around its outer edge, and there is a groove 8 around the outside of the bead where it joins the facepiece. The shoulder and the base of the groove are pressed inwardly by clamping means to hold the base of slot 5 tightly against the edge of the lens in order to form a good seal. At the same time, the clamping means prevents the lens from coming out of the slot in the bead.

In accordance with this invention, the clamping means is a ring 10 that is separated at the opposite ends of the lens into rigid upper and lower halves which are interchangeable. As shown in Fig. 5, the ring has an outer flange 11 that overlies the outer face of bead 4 and engages the shoulder 7. The ring also has a shorter inner flange 12 that extends into the groove and engages its base. The two halves of the ring are adapted to be drawn together so that its flanges will press the bead shoulder and the base of the groove inwardly in order to stretch the bead over the lens and hold the base of slot 5 tightly against the edge of the lens. The depth of the flanges is such that after the ring has been clamped in place, a space 13 remains between the inside of the ring and the bead. Consequently, the ring exerts no pressure radially against the edge of the lens, so there is no danger of the ring breaking the lens. It also serves as a reinforcing frame around the lens to protect it from accidental blows.

In order to clamp the two halves of the ring together, the opposite ends of each half are provided with lugs 15, and the two lugs at each end of the lens are provided with openings for receiving a screw 16 that draws the two lugs together. Since these lugs are a considerable distance behind the foremost point of the ring, as shown in Fig. 1, it is desirable to provide at least one lug in each pair with an inclined surface 17 which engages the adjoining lug. Then, as the two halves of the ring are pulled flat together by the screws, the foremost points of the two halves will be tilted forward toward each other and thus will exert the desired pressure on the bead above and below the lens.

Flexibility of the facepiece is increased for a better fit at its opposite sides by providing it with a groove 19 near each end of the lens, extending from top to bottom of the lens. Preferably, the groove curves around the end of the lens as shown in Fig. 1. Although the lens and its clamping ring hold the immediately surrounding portion of the facepiece fairly rigid, the grooves help the area of the facepiece behind the two grooves to flex freely and conform to the face of the wearer. The thin material at the grooves acts like hinges to permit the sides of the facepiece to spread apart for wide faces without causing distortion or pressure points.

The valve system for this mask is shown best in Fig. 2. It includes a cylindrical valve housing 21, the reduced upper end of which projects up through an opening in the bottom of the facepiece. A collar 22 screwed onto the upper end of the housing forms a seal and also holds the housing in place. The front of the housing is provided with an inlet opening, from which a short tubular coupling 23 extends forward and downward for receiving a hose (not shown) through which air or oxygen (hereinafter called air) is supplied to the mask. The lower end of the valve housing has a central opening from which a tube 24 extends up through the housing and collar. The tube is spaced from both of them so that incoming air can flow up around the tube and into the mask. Frictionally mounted on the upper portion of the tube is a flexible valve member 26 that normally extends out over the collar in sealing engagement therewith. This forms an inhalation valve which prevents exhaled air from passing down around the tube. The exhaled air must flow down through the tube and out of the bottom of the housing. Inhalation through the tube is prevented by an exhalation valve, which may be formed by a flexible diaphragm 27 carried by a spider 28 screwed into the lower end of the housing below the tube.

Another feature of this invention is that the air that is drawn into the mask by inhalation is directed in predetermined paths, so that it will flow across the lens to keep it from fogging. For this purpose an air deflector 31 is mounted inside of the mask. The deflector is a molded sheet and is flexible to some extent, so that it will not interfere with conforming of the facepiece to a face. The body of the deflector is spaced from the facepiece but most of its edge engages the inner surface of the facepiece tightly in sealing engagement therewith to form an air duct. The lower portion of the deflector extends rearwardly and is confined between the bottom of lip 2 and the front of the facepiece, as shown in Fig. 2. The front of the deflector below the lens nearly encircles the inner end of a speaking diaphragm unit 32 mounted in the front of the facepiece. This unit therefore helps to position the deflector in the facepiece. The deflector extends up beside the opposite ends of the lens. The bottom of the deflector is spaced from the lower part of the facepiece and is provided with a hole, through which the upper end of valve tube 24 extends. The deflector is clamped between a shoulder on the tube and a ring 33 screwed onto the upper end of the tube. Consequently, air entering the duct formed between the deflector and facepiece must escape from it into the rest of the facepiece before it can be exhausted through tube 24 and exhalation valve 27. For this purpose and to direct the incoming air across the lens, the edges of the deflector at the opposite ends of the lens are spaced from the facepiece to provide outlets for the duct. When the wearer of the mask inhales air, it is drawn out of these outlets and across the lens, as indicated by the arrows in Figs. 2 and 3. When he exhales, the air is forced out through the tube and exhalation valve. The air duct is easy to form because it is produced when the deflector is snapped into place and connected to the upper end of the tube.

In the modification shown in Fig. 6, the inlet of the valve housing 36 is provided with a diaphragm type inhalation valve 37, and the outlet of the housing is provided with an exhalation valve 38 similar to the one shown in Fig. 2. Both of these valves open into a common chamber, the upper end of which communicates with the inside of a facepiece 39. Mounted in the facepiece is an air deflector 41 similar to the one previously described, but the opening 42 in its bottom is not connected directly to the valve housing. Instead, it normally is closed by a flexible valve diaphragm 43 which opens downwardly. When the wearer of this mask inhales, air is drawn up into the duct formed between the deflector and the facepiece and is directed across the lens in the manner previously described. Upon exhaling, air is forced down through exhalation valve opening 42 in the bottom of the deflector because it cannot return through the air duct. The reason it cannot return is that the inside of the duct has partitions 44 extending across it, which are integral with the deflector. Each of these partitions is provided with an opening that normally is closed by an upwardly opening inhalation valve 45. Consequently, air can pass upward through the partitions but not back down through them. Short circuiting of air during either inhalation or exhalation is avoided by requiring slightly more pressure to open the valves carried by the deflector than to open the valves in the valve housing 36.

Figs. 7 and 8 show a modified way of sealing the lens 50 in place. The seal is effected by a clamping ring 51 similar to the one previously described, except that the inner flange 52 of the ring does not extend down into the groove behind the facepiece bead 53. Instead, a two-part pressure ring 54 is disposed in the channel of the clamping ring and is pressed by it against the base of the groove. The pressure ring is formed from sheet metal or the like and its two parts are moved toward each other when the two halves of the clamping ring are drawn together. Its function is similar to the inner flange of the clamping ring shown in Fig. 5.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A mask comprising a flexible facepiece provided with a longitudinally curved ocular opening extending across it, a thick flexible bead joined to the facepiece and extending around the outside of the opening, a longitudinally curved lens surrounded by the bead, the bead being provided with a slot receiving the marginal portion of the lens and with a shoulder around the outer edge of the bead, there being a groove around the outside of the bead where it joins the facepiece, and clamping means surrounding the bead and pressing said shoulder and the base of said groove inwardly to hold the base of said slot tightly against the edge of the lens, the portion of said bead surrounding the edge of the lens being spaced from said clamping means, whereby said means exerts no pressure inwardly against the edge of the lens.

2. A mask comprising a flexible facepiece provided with a longitudinally curved ocular opening extending across it, a thick flexible bead joined to the facepiece and extending around the outside of the opening, a longitudinally curved lens surrounded by the bead, the bead being provided with a slot receiving the marginal portion of the lens and with a shoulder around the outer edge of the bead, there being a groove around the outside of the bead where it joins the facepiece, and a clamping ring surrounding the bead and having inner and outer flanges pressing said shoulder and the base of said groove inwardly to hold the base of said slot tightly against the edge of the lens, the portion of the clamping ring between said flanges being spaced from the bead, whereby the ring exerts no pressure inwardly against the edge of the lens.

3. A mask according to claim 2, in which said clamping ring is separated at the opposite ends of the lens into upper and lower halves, the adjoining ends of the halves being provided with cooperating pairs of lugs having openings therethrough, and a fastener extending through the openings in each pair of lugs for pulling them together, at least one lug in each pair having an inclined surface engaging the adjoining lug to tend to tilt one of said ring halves forward relative to the other half of the ring.

4. A mask comprising a flexible facepiece provided with a longitudinally curved ocular opening extending across it, a thick flexible bead joined to the facepiece and extending around the outside of the opening, a longitudinally curved lens surrounded by the bead, the bead being provided with a slot receiving the marginal portion of the lens and with a shoulder around the outer edge of the bead, there being a groove around the outside of the bead where it joins the facepiece, a clamping ring surrounding the bead and having an outer flange pressing said shoulder inwardly, and a multiple part pressure ring disposed in said groove and pressed inwardly against the base of the groove by the clamping ring, whereby the base of said slot is held tightly against the edge of the lens, the portion of the clamping ring between said flange and pressure ring being spaced from the flange.

5. A mask comprising a flexible facepiece provided with a longitudinally curved ocular opening extending across it, a thick flexible bead joined to the facepiece and extending around the outside of the opening, a longitudinally curved lens surrounded by the bead and a clamping ring surrounding the bead and pressing it against the marginal portion of the lens, the facepiece being provided near each end of said ocular opening with a groove extending from top to bottom of said opening to increase the flexibility of the facepiece at the opposite ends of the lens.

6. A mask comprising a flexible facepiece provided with a longitudinally curved ocular opening extending across it, a lens mounted in said opening, a deflector disposed inside the facepiece with most of its edge in sealing engagement with the inner surface of the facepiece, the rest of the deflector being spaced from the facepiece to form therewith an air duct, the bottom of the facepiece being provided with an air inlet into said duct, the deflector having edges spaced from the facepiece at the opposite ends of the lens to form duct outlets for directing incoming air across the lens, and valve means directing the air through said duct toward said spaced edges.

7. A mask comprising a flexible facepiece provided with a longitudinally curved ocular opening extending across it, a lens mounted in said opening, a deflector disposed inside the facepiece with most of its edge in sealing engagement with the inner surface of the facepiece, the rest of the deflector being spaced from the facepiece to form therewith an air duct, the bottom of the facepiece being provided with an air inlet into said duct, the deflector having edges spaced from the facepiece at the opposite ends of the lens to form duct outlets for directing incoming air across the lens, an inhalation valve in said air inlet to prevent exhalation through said duct, and an exhalation valve communicating with the inside of the facepiece outside of said duct.

8. A mask comprising a flexible facepiece provided with a longitudinally curved ocular opening extending across it, a lens mounted in said opening, a deflector disposed inside the facepiece with most of its edge in sealing engagement with the inner surface of the facepiece, the rest of the deflector being spaced from the face piece to form therewith an air duct, the bottom of the facepiece being provided with an air inlet into said duct, the deflector having edges spaced from the facepiece at the opposite ends of the lens to form duct outlets for directing incoming air across the lens, inhalation valve means in said duct to prevent exhalation therethrough, said deflector being provided with an outlet opening, and an exhalation valve in said opening.

9. A mask comprising a flexible facepiece provided with a longitudinally curved ocular opening extending across it, a lens mounted in said opening, a deflector disposed inside the facepiece with most of its edge in sealing engagement with the inner surface of the facepiece, the rest of the deflector being spaced from the facepiece to form therewith an air duct, the bottom of the facepiece being provided with an air inlet into said duct, the deflector having edges spaced from the facepiece at the opposite ends of the lens for directing incoming air thereacross, a valve housing having an open upper end mounted in said inlet, an upwardly opening valve member normally closing said upper end, the side of the housing being provided with an air inlet and the lower end of the housing being provided with a hole, a tube extending up from said hole and through said valve member and deflector, and a downwardly opening valve member normally closing off communication between the lower end of said tube and the atmosphere.

10. A mask comprising a flexible facepiece provided with a longitudinally curved ocular opening extending across it, a lens mounted in said opening, a deflector disposed inside the facepiece with most of its edge in sealing engagement with the inner surface of the facepiece, a speaking diaphragm unit mounted in the front of the facepiece below the lens, the deflector substantially encircling the inner end of said unit and snugly engaging it, the rest of the deflector being spaced from the facepiece to form therewith an air duct, the bottom of the facepiece being provided with an air inlet into said duct, the deflector having edges spaced from the facepiece at the opposite ends of the lens to form duct outlets for directing incoming air across the lens, and valve means directing the air through said duct toward said spaced edges.

11. A mask comprising a facepiece provided in its bottom with an opening, a valve housing mounted in said opening and having an open upper end, an upwardly opening valve member normally closing said upper end, the side of the housing being provided with an air inlet and the lower end of the housing being provided with a hole, a tube extending up from said hole and through said valve member, and a downwardly opening valve member normally closing off communication between the lower end of said tube and the atmosphere.

References Cited in the file of this patent

UNITED STATES PATENTS

| | | |
|---|---|---|
| 2,238,492 | Leguillon | Apr. 15, 1941 |
| 2,382,364 | Yant | Aug. 14, 1945 |
| 2,473,518 | Garrard | June 21, 1949 |

FOREIGN PATENTS

| | | |
|---|---|---|
| 910,738 | France | Feb. 11, 1946 |